United States Patent [19]

Moeglich

[11] 4,094,755
[45] June 13, 1978

[54] WATER PURIFICATION METHOD

[75] Inventor: Karl Moeglich, Williamsville, N.Y.

[73] Assignee: Westinghouse Electric Corporation, Gateway Center, Pa.

[21] Appl. No.: 663,790

[22] Filed: Mar. 4, 1976

Related U.S. Application Data

[63] Continuation-in-part of Ser. No. 613,289, Sep. 15, 1975, abandoned, which is a continuation of Ser. No. 487,730, Jul. 11, 1974, abandoned.

[51] Int. Cl.$^2$ ............................ C25B 1/30; C02C 5/12
[52] U.S. Cl. ..................................... 204/149; 204/152; 210/44; 210/50
[58] Field of Search ....................... 204/149, 152, 186; 210/44, 50

[56] References Cited

U.S. PATENT DOCUMENTS

| | | | |
|---|---|---|---|
| 857,277 | 6/1907 | Harris | 204/149 |
| 951,314 | 3/1910 | Hartman | 204/149 |
| 1,194,000 | 8/1916 | Dobyns et al. | 204/149 |
| 3,523,891 | 8/1970 | Mehl | 210/44 |
| 3,767,046 | 10/1973 | Hartkorn | 204/149 |
| 3,915,820 | 10/1975 | Ito et al. | 204/149 |

Primary Examiner—Arthur C. Prescott
Attorney, Agent, or Firm—LeBlanc & Shur

[57] ABSTRACT

An improved method and apparatus for continuously agglomerating solids of colloidal size of larger suspended in a liquid is disclosed. The process comprises passing the liquid between spaced electrode plates in the presence of a fluidized bed of conductive particles, and subjecting said liquid suspension to an electric field from alternating current applied across said electrodes through the conductive particles of said bed. The turbulence of the particles in said bed has been found to improve conductivity and current efficiency, minimize electrode erosion, and by a mechanical, scrubbing action of the bed particles, minimize fouling or scaling of the electrodes so that the suspending forces of said solids are rapidly and efficiently broken. The agglomerated solids may then be separated from the liquid by conventional means such as skimming, settling, flotation and the like.

39 Claims, 14 Drawing Figures

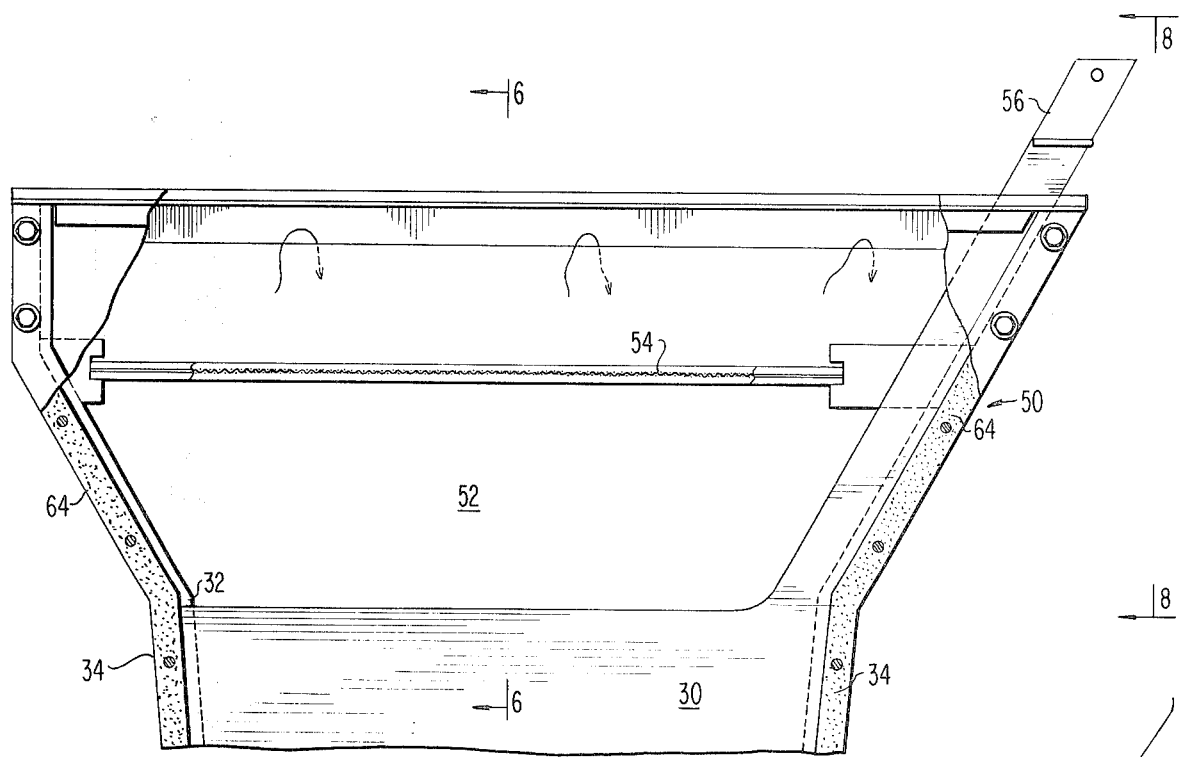
FIG 2
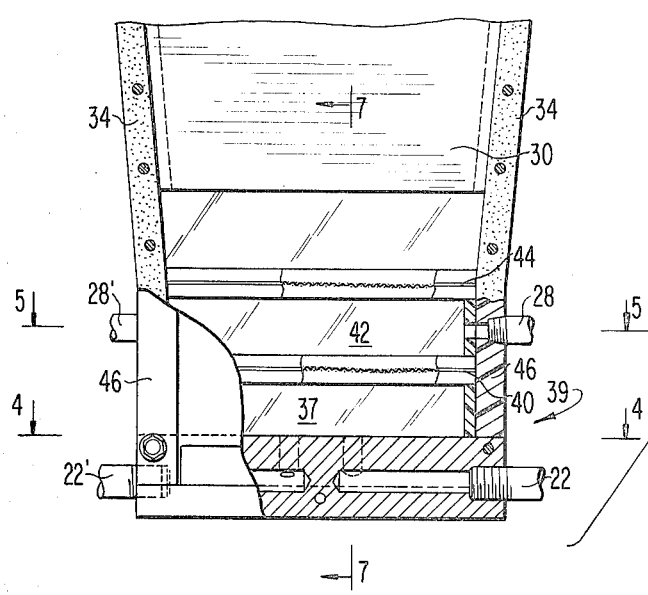
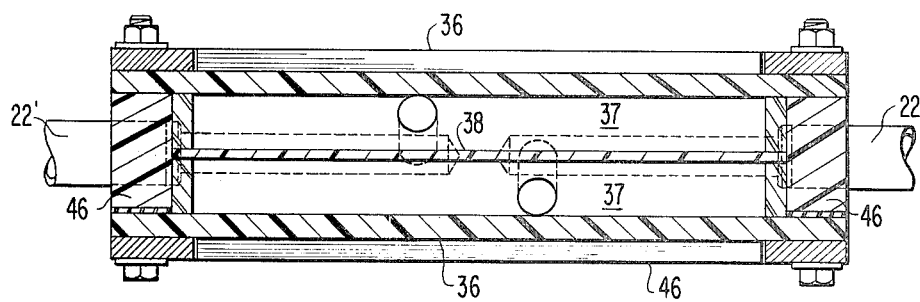
FIG 4

FIG. II
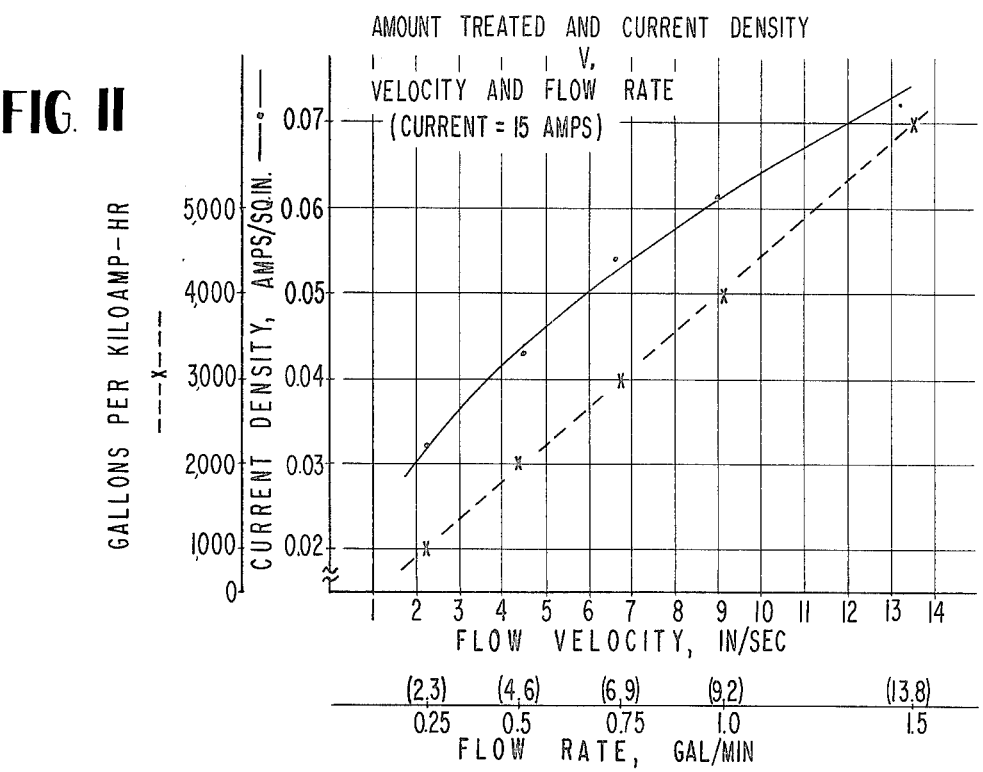
FIG. 12
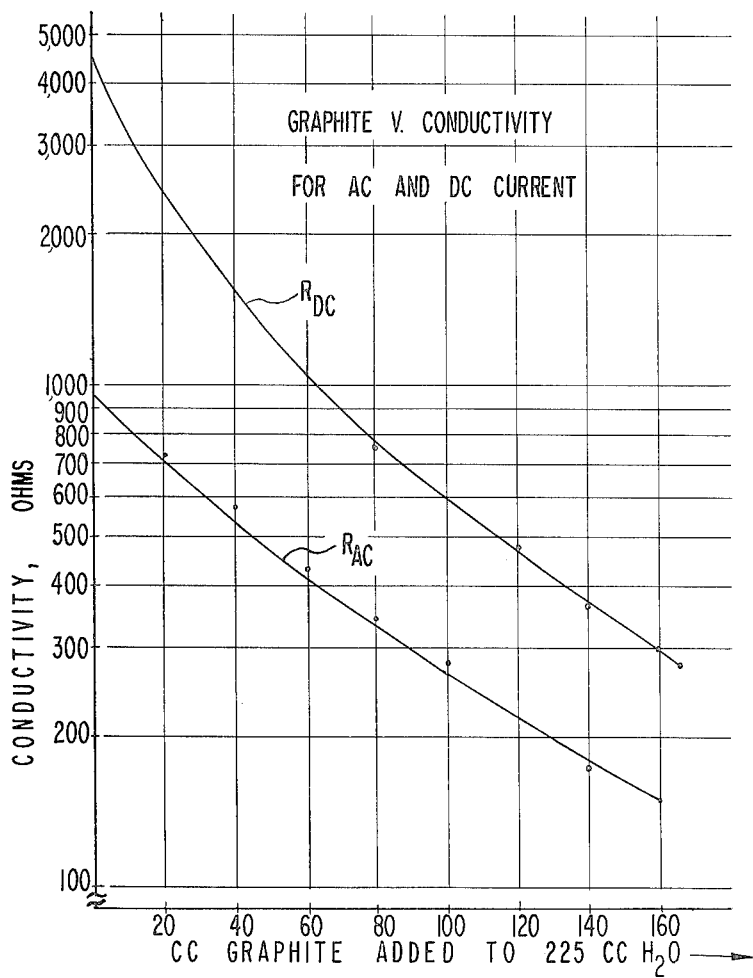

CELL RESISTANCE VS. TEMP

WATER PURIFICATION METHOD

This application is a continuation-in-part of my copending patent application Ser. No. 613,289, filed Sept. 15, 1975, now abandoned, which application in turn was a continuation of application Ser. No. 487,730, filed July 11, 1974 now abandoned. Accordingly, the disclosures of my said applications Ser. No. 613,289 and Ser. No. 487,730, filed Sept. 15, 1975, and July 11, 1974, respectively, are hereby incorporated by reference.

The prior art contains a variety of different processes wherein direct current, or direct current having alternating currents superimposed thereon, is utilized to agglomerate solids suspended in aqueous liquid. U.S. Pat. No. 3,767,046 to Hartkorn is exemplary thereof.

These prior processes incorporate many disadvantages which tend to render them either economically unfeasible or very expensive to operate. For example, prior direct current agglomeration processes are characterized by rapid deterioration of the anode and/or scaling or fouling thereof with organic materials from the solution, impurities from the metal itself, or impurities resulting from grain reactions at the anode surface. Therefore, batch operation is required due to the necessity for frequent shut down to clean or replace the anode, and continuous operation, or operation for extended periods of time is impossible.

A variety of cell additive materials are known in the art for reducing the tendency of the electrodes to scale, to improve current efficiency, and to prolong electrode life. These additives are effective in varying degrees. However, the expense involved in utilizing additives is substantial and is a definite disadvantage in direct current operation. Furthermore, as will be obvious to those skilled in the art, continuous operation or at least semi-continuous operation over a prolonged period of time without the need to shut down to replace or clean the anode is preferable from an economic standpoint to batch operation even with additives.

The aforementioned related patent applications describe a method for agglomerating suspended solids in an aqueous solution which method is characterized by the efficient use of alternating current, alone, to provide continuous operation without the necessity to frequently replace or descale the anode. Alternating current has been found to exert an electrostrictive effect on the suspended materials. In addition, alternating current continuously produces hydrogen peroxide at both electrodes which tends to maintain said electrodes in clean condition during operation. Finally, the hydrogen produced on the electrode has the capability of reacting with the electrode itself to produce, ultimately, minimal quantities of metal hydroxides which act as flocculation seeds to promote flocculation or agglomeration of the solid impurities. The electrostrictive effect and the production of hydrogen peroxide at each electrode are not possible in a direct current cell without the presence of sulfate radicals or other additives. Accordingly, said process is characterized by much more efficient operation in a continuous mode, without the necessity of using costly additives.

It has now been discovered that if the aqueous solution containing solids to be agglomerated is passed between electrodes on a continuous basis in the presence of a fluidized bed of conductive particles, vastly improved agglomeration or flocculation of said solids results from the multiplicity of electrolytic cells presented in the collapsing field of alternating current. In addition, by utilizing conductive particles which are substantially resistent to attrition, a mechanical scrubbing effect will be exerted upon the electrodes which will tend to keep said electrodes clean during continuous operation and thereby avoiding frequent shut downs for descaling. Furthermore, it has been discovered that by utilizing the process of this invention electrode erosion is reduced to approximately 0.2 percent of that found in direct current procedures.

Accordingly, the process of this invention by utilizing a turbulent fluidized bed of conductive particles achieves the advantage of continuous operation with high current efficiency.

It should be noted that the fluidized bed may be established in the cell of this invention with the process water alone, or with the process water augmented by a gas such as air injected into the vessel. Once a fluidized state has been established, the likelihood of bridging, short circuits and the like between the electrodes is eliminated. Increased turbulence then increases the efficiency of the process of this invention with the upper limit thereof to be governed only by the process economics.

In an embodiment of this invention, gas assisted turbulence is aided by disposing the side wall of the cell vessel at an angle to the vertical axis of said vessel. The angled side walls then increase the ease with which a true fluidized bed may be established within the vessel and increase the scrubbing action against the electrode faces by the bed particles.

Under the alternating current electric field, the conductive particles become, as noted above, bipolar electrodes so that the cell contains a multiplicity of said electrodes with each electrode providing its own boundary layer. The particle movement inherent in the fluidized bed not only ensures a continuous scrubbing or cleaning of the electrode faces, but of the individual particles and their boundary layers. Accordingly, the maximum turbulence consistent with a given apparatus will provide the maximum efficiency achievable according to the process of this invention.

As in the aforementioned patent applications, it is preferred to utilize alternating currents having a frequency of between 0.2 and 800 Hz across the electrodes generating an electric current having a magnitude of about 0.08 to 6.0 ampheres per square inch through said bed. In addition, however, it is also preferred to maintain a residence time in said bed of between nine and twenty-five seconds and a spacing of said electrodes of between about one-quarter and two inches and most preferably about one-half inch. The spacing between the electrode faces, however, may be greater than two inches, if desired. However, it is preferred to utilize a spacing of about one-half inch, and multiple cells in parallel to accomodate the volume of process water desired.

Accordingly, it is an object of this invention to provide an improved process for agglomerating solids suspended in an aqueous liquid by passing the liquid to be processed through an alternating current electric field while maintaining a turbulent condition thereof for the generation of hydrogen peroxide at each electrode.

It is another object to provide a process whereby solids suspended in an aqueous solution are agglomerated by exposing said solids to a fluidized bed containing conductive particles subjected to an alternating current field.

It is another object to provide a process whereby said suspended solids are agglomerated by the action of a multiplicity of electrodes in a collapsing alternating current field in a turbulent fluidized bed of conductive particles whereby the suspension forces are broken and said solids cause to clump, agglomerate, or flocculate.

It is yet another object to provide an apparatus for agglomerating solids suspended in a liquid comprising spaced electrodes with a source of alternating current coupled thereto in a vessel with a turbulent fluidized bed of conductive particles disposed therebetween.

It is still another object to provide an apparatus for agglomerating solids suspended in a liquid including a fluidized bed of conductive particles subjected to an alternating current from spaced electrodes on either side thereof whereby a tubulent condition is maintained in said bed and a multiplicity of electrodes are provided by the particles therein to exert the effect of a multiplicity of electrodes on said solids and to thereby disband the suspending forces and cause said solids to clump together so that they may be separated from the liquid by conventional techniques.

It is yet another object to provide a fluidized bed vessel having opposed, spaced electrode faces and side walls disposed at an angle to the vertical axis thereof whereby the bed may be maintained in a turbulent condition to thereby exert a scouring effect upon the electrode faces to minimize scaling of impurities thereon.

These and other objects will become readily apparent with reference to the drawings and following description wherein:

FIG. 2 is a vertical sectional view of the vessel portion of the apparatus of FIG. 1 having the center portion removed;

FIG. 4 is a sectional view taken along lines 4—4 of FIG. 2;

FIG. 11 is a graphical representation of the relationship between the amount of process water treated and current density versus the velocity and flow rate;

FIG. 12 is a graphical representation of the cell resistance as graphite particles are added to water for both alternating current and direct current;

Figure 1:
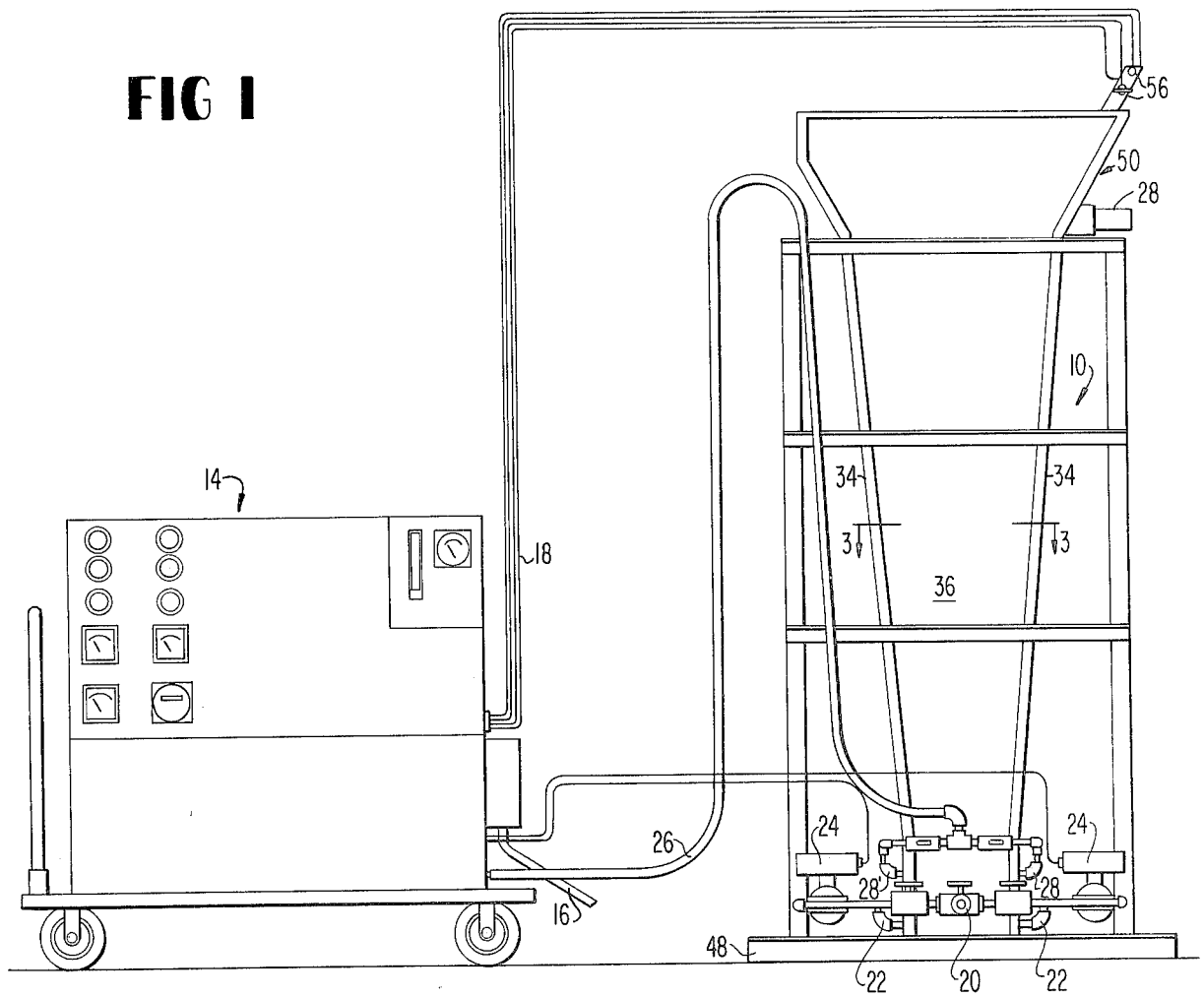
FIG. 1 is a plan view of an apparatus preferred for utilization of the process of this invention.

With reference to the drawings, FIG. 1 represents a preferred version of an apparatus of this invention for processing aqueous liquids containing suspension of solid materials. The apparatus includes a vessel 10 which may contain any desired number of cells such as two as illustrated herein (see FIG. 3), and as will be subsequently described. Each cell 12 in vessel 10 is controlled through a console 14. Console 14 is utilized to monitor and regulate the turbulence in the cell and to apply the desired current and voltage to the electrodes. The console 14 may be coupled to a source of electrical energy by, for example, a cable 16, and supplies the desired voltage and current to the cell electrodes through cables 18. It will be obvious to those skilled in the art that console 14 is not an essential feature of this invention, and individual control may be utilized.

Turbulence, as noted previously, may be established by the process water admitted to the cell, or may be augmented with a gas such as air. In the case of a multiplicity of cells, it is preferred to provide a separate water inlet and air inlet for each cell. Accordingly, as shown in FIG. 1, process water is pumped through a conduit 20 to cell inlets 22 and 22' in the lower portion of the vessel 10. The flow of process water may be monitered, for example, by flow meters 24. The gas for augumenting the fluidized bed condition within each cell, which in the preferred embodiment is air, is pumped to the lower portion of each cell through conduit 26 and admitted through inlets 28 and 28'. Console 14 may contain a variety of meters, gauges and the like for regulating the flow and monitering the flow into cells 12. The vessel 10 also includes an outlet 28 in the upper portion thereof for the water with agglomerated solids which has been processed according to the process of this invention. Water with solids exiting outlet 28 may be conveyed by conventional means to any desired separating device such as a settling tank, centrifuge, skimmer, flotation cell, or the like.

Figure 3:
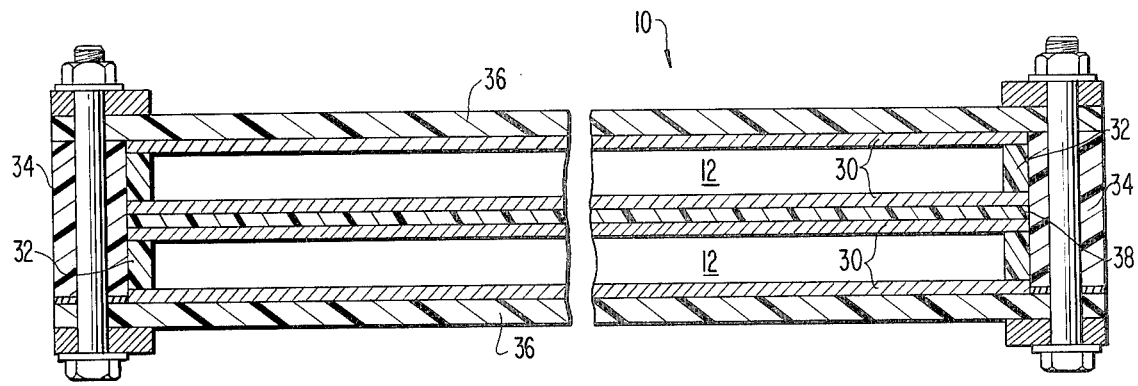
FIG. 3 is a sectional view taken along lines 3—3 of FIG. 1.
Figure 5:
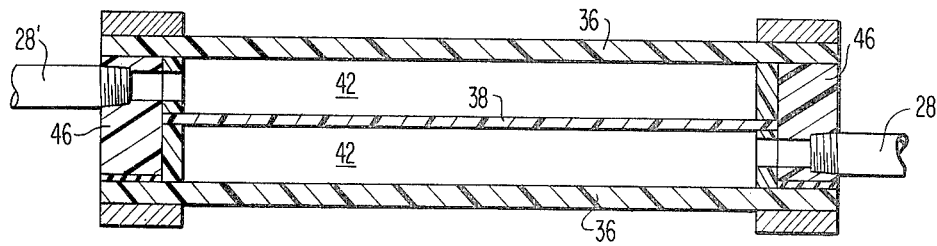
FIG. 5 is a sectional view taken along lines 5—5 of FIG. 2.
Figure 7:
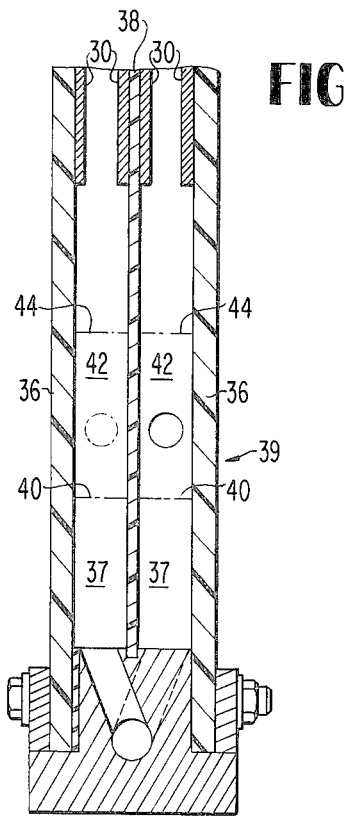
FIG. 7 is a sectional view taken along lines 7—7 of FIG. 2.

With attention to FIG. 3, the vessel 10 comprises in this embodiment twin cells 12 housing opposed electrodes 30. Electrodes 30 are separated by an insulating spacer 32, and are supported by side walls 34 and face walls 36. The inner electrodes are also separated by an insulating spacer 38.

The electrodes in each cell 12 may preferably be of any non-valve metal such as aluminum, magnesium or steel. For most applications, however, aluminum will be preferred. The opposed electrodes are spaced, as noted above, a distance from about one-quarter to at least two inches, but preferably about one-half inch apart. Any number of cells 12 may be utilized in vessel 10 as prefereed from one or two as shown in FIG. 3 up to ten or more. In each instance, the electrodes will preferably be disposed in parallel.

While the upstanding side walls 34 of vessel 10 may be vertical, it is preferred to have the walls disposed at an angle thereto. Preferably the angle will be between five and thirty degrees to the vertical and most preferably ten degrees. The angle of side walls 34 as noted above is intended to facilitate the establishment of a turbulent fluidized bed within each cell 12. Electrodes 30 extend substantially the entire central portion of vessel 12 nearly coextensive with the angled side walls 34.

With attention to FIGS. 2, 4, 5, and 7, an inlet chamber 37 is disposed in the base 39 of vessel 10 for mixing the process water admitted through inlets 22 and 22' and the air may be admitted through inlets 28 and 28' into mixing chamber 42 to establish the desired turbulence. A screen 40 is disposed above the inlet chamber 37 and below the mixing chamber 42. A screen 44 is also disposed above mixing chamber 42 to, as will be subsequently described, support the fluidized bed and maintain it confined to the central portion of vessel 10 between the angled side walls 34. The side walls 46 of the lower portion 39 of vessel 10 may be vertical as shown. Vessel 10 may be supported on a base 48, as desired.

Figure 6:
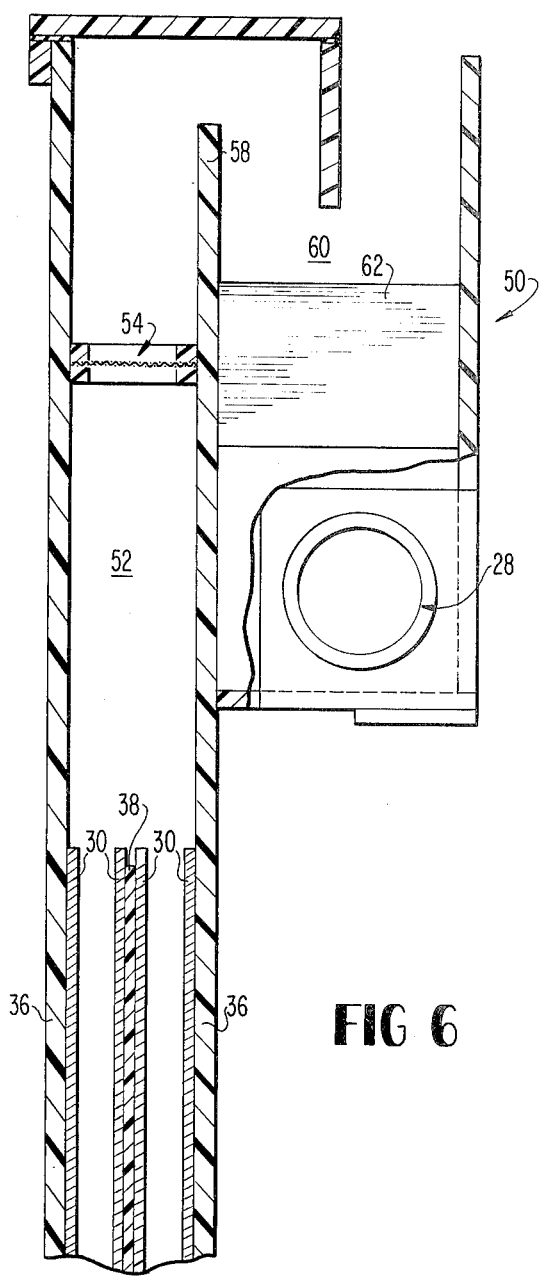
FIG. 6 is a sectional view taken along lines 6—6 of FIG. 2.
Figure 8:
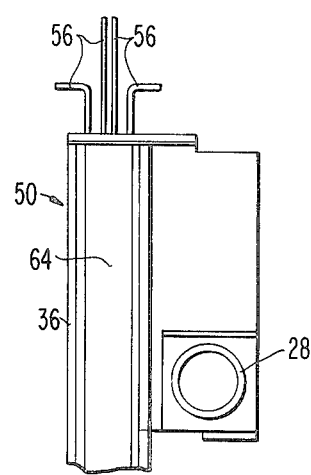
FIG. 8 is a sectional view taken along lines 8—8 of FIG. 2.

With attention to FIGS. 2, 6, and 8, the upper portion 50 of vessel 10 houses an upper disengagement chamber 52 disposed above electrodes 30. A screen 54 is disposed above chamber 52 to maintain the fluidized bed within vessel 10. Electrode leads 56 extend from electrodes 30, and are adapted to be coupled to cables 18 connecting the electrode 30 with console 14 and the source of electrical energy transmitted therethrough.

As process water passes upwardly through screen 54, a weir 58 is provided which separates the interior of vessel 10 from an outlet collection chamber 60 wherein the processed water 62 is collected for removal through outlet 28. The processed water from outlet 28 is then, as noted above, transported by any conventional means to a solid separation device such as a skimmer, settling tank, centrifuge, or the like (not shown). In the alternative the processed water may be recycled through inlet 20 in vessel 10 with the agglomerated solids serving as flocculation seeds to achieve greater purity.

The side walls 64 and front and rear walls 36 may be integral with the corresponding side and front and rear walls of the central portion of vessel 10, or may be welded thereto. Said walls may be of any desired configuration adapted to form chamber 52, and outlet chamber 60 as will be obvious to those skilled in the art.

The exact particle size of the constituents of the fluidized bed is not critical, and may range from about three millimeters to up to about one-fourth inch. On the basis of tests conducted, to achieve bed stability at a residence time desired, the ideal particle would be a sphere of approximately one-eighth inch diameter and a specific gravity of approximately two. The material utilized, however, could be any conducting material which has excellent mechanical and chemical stability. It is preferred, however, that the bed of particles be capable of true fluidization. Absent a fluidized bed condition, as noted above, bridging and short circuits can result which may diminish current efficiency. In a preferred version of this invention, a graphite pellet is utilized which was cylindrical and nominally 0.125 inches in diameter by 0.19 inches long, with a specific gravity of 2.1. The cylindrical pellets were found to enhance the turbulence of the fluidized bed, and to increase the electrical effect thereof.

Figure 14:
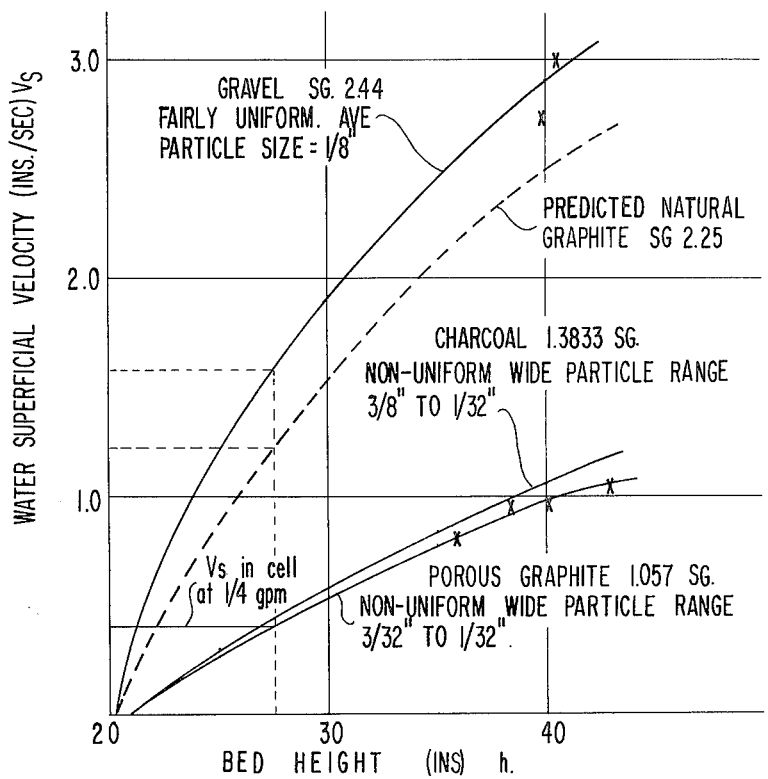
FIG. 14 is a graphical representation of the linear flow rate versus bed height for establishing fluidization with different particle bed constituents.

FIG. 14 illustrates the results of tests directed to establishing a fluidized bed in a tube having an inside diameter of ⅝ inches, filled with possible bed constituents. Each was fluidized with water at the various velocities shown, and the bed height relative to velocity is illustrated in FIG. 14.

Figure 13:
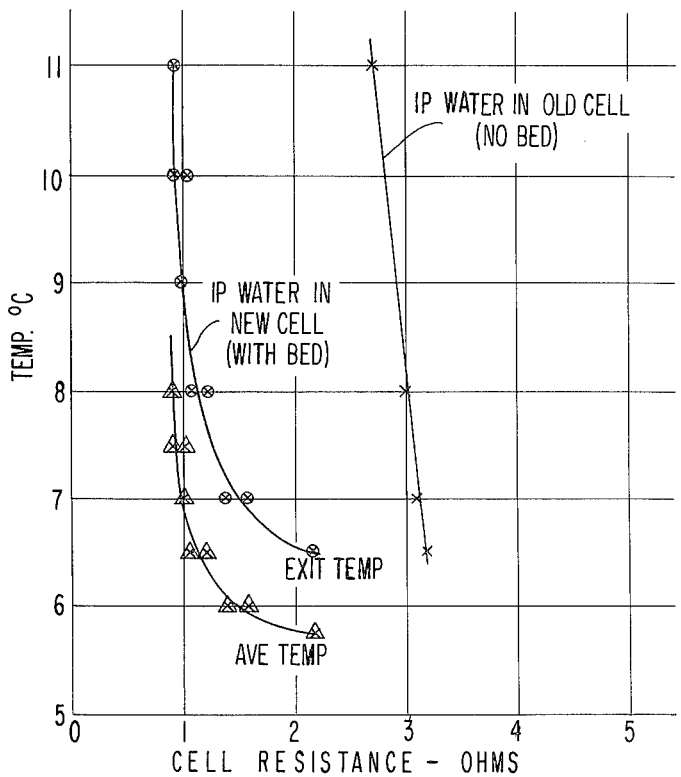
FIG. 13 is a graph representing the temperature in the cell with relation to the cell resistance in a situation wherein there is no fluid bed, and a situation wherein there is a fluidized bed within said cell.

A series of tests was also conducted utilizing a cell having parallel side walls and an electrode plate spacing of 0.403 inches to evaluate the conductivity of the graphite particles selected relative to temperature in a fluidized bed, and alternatively in a condition wherein fluidization is not established. It was found that, for example, at a water flow rate of 1.5 gallons per minute and an air flow rate of 0.2 SCFM, the bed was expanded from a "no flow" height of 15¾ inches to a completely fluidized height of 32 inches. Dramatic flocculation occurred with a current density of 0.19 amps per square inch and a power consumption equivalent to 3.11 kwhrs per 1000 gallons. Significantly lower power consumption was experienced with said fluidized bed compared with the power consumption experienced with no bed as shown in FIG. 13.

FIG. 12 also illustrates cell resistance as graphite pellets are added to 225 ccs of water to illustrate the greatly increased ductivity found with alternating current as compared to direct current in a fluidized bed environment.

Figure 9:
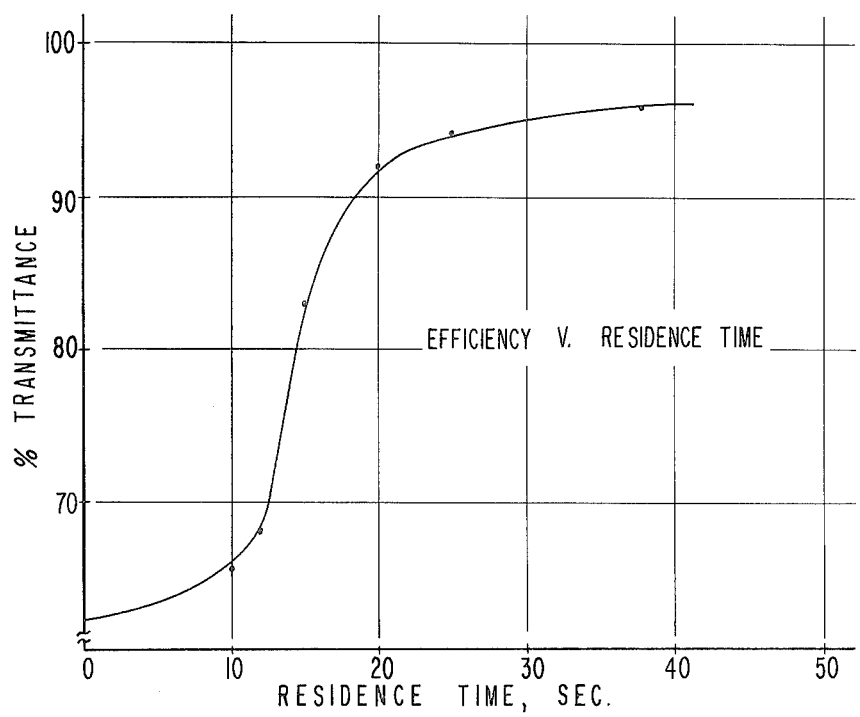
FIG. 9 is a graph representing the efficiency of the process of this invention as measured by percent transmittance versus residence time in a vessel of this invention.
Figure 10:
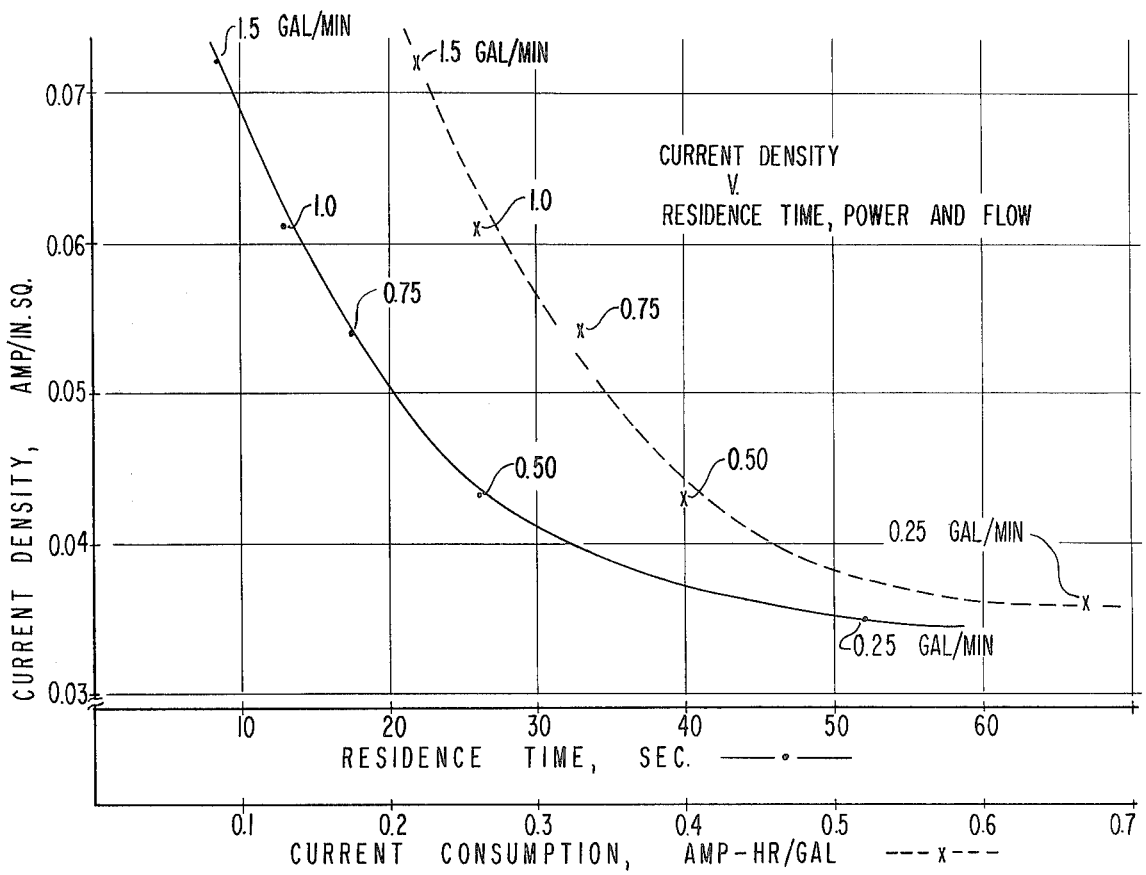
FIG. 10 is a graph representing current density versus residence time, current consumed, and flow rate.

FIGS. 9–11 illustrate the results achieved in tests conducted in the device of FIGS. 1-8 wherein the plate spacing was one-half inch between electrodes, and the bed volume was about two-thirds of the actual volume between the electrodes. In addition, the side walls were disposed at a ten degree angle to the verticle.

With attention to FIG. 9, this graph depicts efficiency of the device of this invention as compared to residence time for the liquid being processed. Efficiency is measured as the percent of light transmittance as measured with a spectrophotometer at $\lambda = 5500$ A° with distilled water as a standard equalling 100 percent. Thus, the efficiency, or percent transmittance, measures the clarity of the water processed as compared to distilled water. While the water processed in this example, the results of which are depicted in FIG. 9, was white water paper mill effluent, the results are representative for other liquids processed. As shown therein, the optimum residence time should fall in the linear portion of the graph between about nine and twenty-five seconds. A longer residence time achieved little increase in transmittance as compared to the current required. Accordingly, residence time in the device of this invention is preferred between nine and twenty-five seconds total.

The following are exemplary results achieved utilizing the device of this invention:

The device of this invention has been used to treat a variety of waste waters including coke oven flushing liquor, well water containing colloidal iron, and process water containing colloidal graphite paper mill kraft and soda mill waters, machine shop oil in water emulsions, cheese whey, copper drawing soap effluent, domestic sewage, paper mill lagoon sludge, and various other commercial and domestic waste streams. In all cases suspended solids were significantly reduced within the preferred residence time as above noted.

The following are specific examples utilizing the process of this invention. In each the fluidized bed was established with graphite pellets having a specific gravity of about 2.1.

EXAMPLE I

A flow rate, total, of 3.5 to 5 gpm of colloidal graphite contaminated water and an air flow rate of one to 1.5 SCFM in the two cell vessel of FIGS. 1-8 was used to establish good fluidization with cylindrical graphite pellets as described above having a specific gravity of about 2.1. A total current of 30 amps, a voltage of 50 VAC and 60 Hz was applied across the electrodes and the colloidal suspension was "broken". Suspended solids were reduced from 1285 ppm in the untreated water to 38 ppm after one pass through the unit followed by approximately two hours settling time in a holding tank, not shown. The influent water was at a temperature of 34° to 38° F. Higher influent temperatures would obviously result in a higher conductivity, e.g., as a general rule water at 70° F. has a conductivity of 2 to 3.75 that of water at 32° F. depending on the amount and type of impurities.

EXAMPLE II

Paper mill lagoon sludge was processed in an apparatus of this invention as described in FIGS. 1-8. The sludge had originally been treated with aluminum sulfate but contained suspended solids which under normal conditions would remain suspended for years. The sludge had a very high viscosity and zero percent transmittance. The suspended solids amounted to 5.4 percent by weight, and the aluminum hydroxide equalled 1.3 percent of the solids.

The sludge was diluted 3:1 with city water. The flow rate of the device of this invention was three gallons per minute, 60 amps current and 60 VAC were applied across the electrodes.

The processed sludge contained solids which precipitated within ten minutes and the suspension forces were totally broken. The transmittance of the supernatant of the processed sludge after one hour was measured at 86.5 percent at 475 mu. Suspended solids remaining were measured at 11 ppm.

In summary then it has been discovered that alternating current applied through a turbulent fluidized bed of conductive particles will efficiently and economically reduce solids suspended in water on a continuous basis. The turbulence established increases current efficiency, and contributes to an electrostrictive effect whereby a multitude of bipolar electrodes are established within the cell to break down the suspending forces of the solids. The solids then clump together whereby they may be easily removed by settling, skimming, or the like.

In contrast to prior art procedures, by utilizing alternating current the electrode remain relatively clean for efficient, continuous operation due primarily to the generation of hydrogen peroxide, and a mechanical scrubbing action by the bed particles. The hydrogen peroxide as will be obvious to those skilled in the art also contributes to decolorization and deodorization of the water processed. Most importantly, however, alternating current allows continuous operation without the need to shut down and replace a sacrificial anode, or to descale the anode, and does not require costly additives for efficient operation. The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by U.S. Letters Patent is:

1. A continuous method for agglomerating solids of colloidal size or larger suspended in aqueous media comprising:
   providing at least a pair of metal electrodes having facing surface areas substantially closely spaced with respect to one another;
   causing said media and suspended solids to continuously flow between and past the facing surfaces of said spaced electrodes;
   causing said suspended solids to agglomerate by applying an alternating (AC) voltage at a frequency between about 0.2 Hz and 800 Hz across said electrodes while
   controlling said AC voltage in relation to the spacing between said electrode surface areas and the conductivity of said media so as to provide an alternating electric current flowing between said electrode surfaces with the value of said alternating current being between about 0.08 to 6.0 amperes per square inch of electrode surface to produce hydrogen peroxide at said surfaces as said aqueous media passes; and
   providing fluid-induced agitation of said media so as to create turbulence of a Reynolds number of at least about 10,000 in said media as the same flows between and past the spaced facing surfaces of said electrodes whereby the suspending forces of said solids will be broken so that said solids will agglomerate for removal from said media.

2. A continuous method for agglomerating solids of colloidal size or larger suspended in aqueous media comprising:
   providing at least a pair of metal electrodes having substantially parallel facing surface areas substantially closely spaced with respect to one another, said electrodes being of a metal other than the noble metals and valve metals;
   causing said media and suspended solids to continuously flow between and past the facing surfaces of said spaced electrodes;
   causing said suspended solids to agglomerate by applying an alternating (AC) voltage at a frequency between about 0.2 Hz and 800 Hz across said electrodes while
   controlling said AC voltage in relation to the spacing between said electrode surface areas and the conductivity of said media so as to provide an alternating electric current flowing between said electrode surfaces, with the value of said alternating current being about 0.08 to 6.0 amperes per square inch of electrode surface; and
   providing compressed gas causing agitation of said media so as to create turbulence of a Reynolds number of at least about 10,000 in said media as the same flows between and past the spaced facing surface of said electrodes;
   maintaining the herein stated conditions so that as said media passes between said metal electrodes metal hydroxides are caused to be formed at said electrode surfaces during the passing of current there between;
   controlling the rate of flow of said media so that the same passes between said electrode faces sufficiently long to cause the particles in colloidal suspension to be agglomerated into solid particles of a size exceeding at least about 5,000 Angstrom units and so that such solid particles are no longer in colloidal suspension in said media.

3. A method as set forth in claim 2 wherein the metal of said electrodes is a member selection from the group consisting of aluminum, an aluminum alloy, iron, magnesium, or steel.

4. A method as set forth in claim 2 wherein said metal hydroxides are caused to be formed at said electrode surfaces without the presence of alkali-halide salt additives in the said media.

5. A method as set forth in claim 2 wherein alkali-halide salts are present in the media as it flows past and between surfaces of said spaced electrodes.

6. A method as set forth in claim 2 wherein said metal hydroxides are caused to be formed at said electrodes without external addition of hydroxides to said media passing between said electrodes.

7. A method as set forth in claim 2 wherein the stated conditions are maintained so that said alternating current passing between said electrodes produces hydrogen peroxide at said electrodes causing said metal hydroxides to be formed at said electrodes.

8. A method as set forth in claim 2 wherein the facing surfaces of said electrodes are caused to be spaced from each other approximately one-half inch at the commencement of operation of such method.

9. A method as set forth in claim 2 wherein a pH range of between 2 and 9 is maintained during the flow of said media past and between said electrodes.

10. A method as set forth in claim 2 wherein there is added to said media flowing past and between said electrodes a conductive material which enhances establishing and maintaining an alternating current passing between said electrode surfaces with a current density within the range above stated.

11. A method as set forth in claim 10 wherein said material added to said media is at least one suitable salt soluble in said media.

12. A method as set forth in claim 2 wherein said current density of the alternating current passing between said electrode surfaces is maintained between about 0.08 and 3.0 amperes per square inch.

13. A method as set forth in claim 2 wherein said alternating current density is maintained between about 0.08 and 0.5 amperes per square inch.

14. A method as set forth in claim 2 wherein said alternating current density is maintained at about 0.19 amperes per square inch.

15. A method as set forth in claim 2 wherein said alternating current density is maintained at about 1.0 amperes per square inch.

16. A method as set forth in claim 2 wherein said alternating current density is maintained at about 1.5 amperes per square inch.

17. A method as set forth in claim 2 wherein said alternating current density is maintained at about 2.0 amperes per square inch.

18. A method as set forth in claim 2 wherein said alternating current density is maintained at about 2.5 amperes per square inch.

19. A method as set forth in claim 2 wherein said alternating current density is maintained at about 3.0 amperes per square inch.

20. A method as set forth in claim 2 wherein said alternating current density is maintained at about 3.5 amperes per square inch.

21. A method as set forth in claim 2 wherein said alternating current density is maintained at about 4.0 amperes per square inch.

22. A method as set forth in claim 2 wherein said alternating current density is maintained at about 5.0 amperes per square inch.

23. A method as set forth in claim 2 wherein said alternating current density is maintained at about 6.0 amperes per square inch.

24. A method as set forth in claim 2 wherein said alternating (AC) voltage is between about 10 Hz and 400 Hz.

25. A system and continuous method for agglomerating particles of colloidal size or larger suspended in aqueous media to be treated comprising:
providing at least a pair of spaced metal electrodes containing aluminum having substantially parallel facing surface areas spaced from each other approximately one-half inch at the initiation of such system at least the facing surface areas of said electrodes being aluminum;
causing said media and suspended solids to be treated to continuously flow between and past the facing surfaces of said spaced electrodes;
causing said suspended solids to agglomerate by applying an alternating (AC) voltage at a frequency between about 10 Hz and 400 Hz across said electrodes while
controlling said AC voltage in relation to the spacing between said electrode surface areas and the conductivity of said media to be treated so as to provide an alternating electric current flowing between said electrode surfaces with the value of said alternating current being between about 0.08 to 6.0 amperes per square inch of electrode surface; and
causing agitation of said media to be treated so as to create turbulence of said media as the same flows between and past the spaced facing surfaces of said electrodes;
maintaining the herein stated conditions so that as said media to be treated passes between said electrodes, said alternating current produces hydrogen peroxide at said electrodes causing metal hydroxides to be formed at said electrode surfaces during the passing of current therebetween;
maintaining a pH range of between 2 and 9 during the flow of said media between and past said electrodes;
controlling the rate of flow of said media so that the same passes between said electrode faces sufficiently long as to cause the particle in colloidal suspension to be agglomerated into solid particles of a size exceeding at least about 5,000 Angstrom units and so that such solid particles are no longer in colloidal suspension in said media.

26. A method as set forth in claim 25 wherein said metal hydroxides are caused to be formed at said electrode surfaces without the presence of alkali-halide salt additives in the same media.

27. A method as set forth in claim 25 wherein alkali-halide salts are present in the media as it flows past and between surfaces of said spaced electrodes.

28. A method as set forth in claim 25 wherein said metal hydroxides are caused to be formed at said electrodes without external addition of hydroxides to said media passing between said electrodes.

29. A method as set forth in claim 25 wherein there is present in said media flowing past and between said electrodes a conductive material which enhances establishing and maintaining an alternating current passing between said electrode surfaces with a current density within the range above stated.

30. A method as set forth in claim 25 wherein said current density of the alternating current passing between said electrode surfaces is maintained between about 0.08 and 3.0 amperes per square inch.

31. A method as set forth in claim 25 wherein said alternating current density is maintained between about 0.08 and 0.5 amperes per square inch.

32. A method as set forth in claim 25 wherein said alternating current density is maintained at about 0.19 amperes per square inch.

33. A method as set forth in claim 25 wherein the flow rate of said media is maintained so that said media resides between said electrodes for from about 9 to about 25 seconds.

34. A system and continuous method for agglomerating solids of colloidal size or larger suspended in aqueous media to be treated comprising:
providing at least a pair of spaced aluminum metal electrodes having substantially parallel facing surface areas spaced from each other approximately one-half inch at the initiation of such system;
causing said media and suspended solids to be treated to continuously flow between and past the facing surfaces of said spaced electrodes;
causing said suspended solids to agglomerate by applying an alternating (AC) voltage at a frequency between about 10 Hz and 400 Hz across said electrodes while
controlling said AC voltage in relation to the spacing between said electrode surface areas and the conductivity of said media to be treated so as to provide an alternating electrode current flowing between said electrode surfaces with the value of said alternating current being about 0.08 to 6.0 amperes per square inch of electrode surface to produce hydrogen peroxide at said surfaces as said aqueous media passes; and
causing gas induced agitation of said media to be treated so as to create turbulence of a Reynolds number of at least about 10,000 in said media as the same flows between and past the spaced facing surfaces of said electrodes;
maintaining a pH range of between 2 and 9 during the flow of said media between and past said electrodes;
controlling the rate of flow of said media so that the same resides between said electrode faces for from about 9 to 25 seconds to cause the particles in colloidal suspension to be agglomerated into solid particles of a size exceeding at least about 5,000 Angstrom units and so that such solid particles are no longer in colloidal suspension in said media.

35. A method as set forth in claim 34 wherein metal hydroxides are caused to be formed at said electrode surfaces during the passage of current therebetween.

36. A method as set forth in claim 34 wherein there is maintained in said media between said electrodes a conductive material which enhances establishing and maintaining an alternating current passing between said electrode surfaces with a current density within the range above stated.

37. A method as set forth in claim 34 wherein said current density of the alternating current passing between said electrode surfaces is maintained between about 0.08 and 3.0 amperes per square inch.

38. The method of claim 36 wherein said conductive material is graphite.

39. The method of claim 36 wherein said conductive material has a specific gravity of about 2 to 2.1.

* * * * *